US005609028A

United States Patent [19]

Kakuda et al.

[11] Patent Number: 5,609,028

[45] Date of Patent: Mar. 11, 1997

[54] PNEUMATIC TOOL

[75] Inventors: Nobuyuki Kakuda; Noriyuki Nishido, both of Anjo, Japan

[73] Assignee: Makita Corporation, Anjo, Japan

[21] Appl. No.: 612,016

[22] Filed: Mar. 5, 1996

[30] Foreign Application Priority Data

Mar. 6, 1995 [JP] Japan .................................... 7-045569

[51] Int. Cl.[6] ..................................................... F16D 31/02

[52] U.S. Cl. ................................................ 60/407; 60/469

[58] Field of Search .............................. 60/407, 469, 409, 60/410

[56] References Cited

U.S. PATENT DOCUMENTS 3,094,845 6/1963 Mallofre .................................... 60/407
3,150,488 9/1964 Haley ..................................... 60/469 X
3,398,533 8/1968 Wolfbauer ................................. 60/407
4,404,799 9/1983 Duder .................................... 60/469 X

FOREIGN PATENT DOCUMENTS 55-41493 9/1980 Japan .

*Primary Examiner*—Hoang Nguyen
*Attorney, Agent, or Firm*—Dennison, Meserole, Pollack & Scheincr

[57] ABSTRACT

A pneumatic tool includes a body having a pressure accumulation chamber formed therein for accumulating compressed air. A cap are mounted on the body and has a cap chamber formed therein for communication with the pressure accumulation chamber. The cap has a joint for connection with an air hose from a compressed air source. A gasket is interposed between the pressure accumulation chamber and the cap chamber from each other. The gasket itself forms a valve for preventing a counterflow of the air from the pressure accumulation chamber to the cap chamber, so that exhaust sounds of the air is prevented from being produced when the air hose is disconnected from the joint.

9 Claims, 3 Drawing Sheets

PNEUMATIC TOOL

BACKGROUND OF THE INVENTION

1. Field of the Invention

The present invention relates to a pneumatic tool.

2. Description of the Prior Art

A conventional pneumatic tool such as a pneumatic nailer includes a body having a handle which forms a pressure accumulation chamber therein. The handle has a joint to which an air hose from a compressed air source is connected, so that the compressed air is supplied from the compressed air source to the pressure accumulation chamber via the hose and the joint. The compressed air within the pressure accumulation chamber is used to move a driver of the nailer for driving nails.

With this conventional pneumatic tool, when the hose is removed from the joint after compression of the driving operation, the air accumulated within the pressure accumulation chamber is abruptly exhausted to the outside, so that unpleasant exhaust sounds are produced when the air passes through the joint.

To this end, the prior part has proposed to provide a sound reduction device. For example, Japanese Utility Model Publication No. 55-41493 discloses a sound reduction device 30 as shown in FIG. 5 of this application which corresponds to FIG. 3 of the publication. The sound reduction device 30 includes an air channel 35 which is formed in an end wall of a handle of a nailer and which connects a pressure accumulation chamber 32 and a joint 31 to each other. A valve chamber 33 is formed in the midway of the air channel 35 and movably receives a valve body 34. When a hose from an air source (not shown) is connected to the joint 31, the valve body 34 is moved leftwardly as viewed in FIG. 5 to open the air channel 35. On the other hand, when the hose is disconnected from the joint 31, the valve body 34 is moved rightwardly as viewed in FIG. 5 to close the air channel 35, so that the air within the pressure accumulation chamber 32 may not abruptly be exhausted to the outside, thus producing no unpleasant sound.

However, the above conventional sound reduction device 30 involves the problem that troublesome machining operations are required and that the manufacturing costs are increased because of the provision of the air channel 35 between the joint 31 and the pressure accumulation chamber 32 and the provision of the valve chamber 33 in the midway of the air channel 35.

SUMMARY OF THE INVENTION

It is, accordingly, an object of the present invention to provide a pneumatic tool having an exhaust sound reducing device which are simple in construction.

It is another object of the present invention to provide such a pneumatic tool which can be easily manufactured and assembled.

It is a further object of the present invention to provide such a pneumatic tool which can be manufactured at lower costs.

According to the present invention, there is provided a pneumatic tool comprising:

a body having a pressure accumulation chamber formed therein for accumulating compressed air;

a cap mounted on the body and having a cap chamber formed therein for communication with the pressure accumulation chamber, the cap having a joint for connection with an air hose from a compressed air source; and a gasket interposed between the pressure accumulation chamber and the cap chamber, the gasket itself forming a valve for preventing a counterflow of the air within the pressure accumulation chamber to the cap chamber, so that exhaust sounds of the air is prevented from being produced when the air hose is disconnected from the joint.

With this construction, since the gasket itself forms the valve for preventing the counterflow of the air from the pressure accumulation chamber to the cap chamber, the air channel and the valve chamber as in the conventional sound reducing device are not required.

In operation, when the air hose is connected to the joint of the cap, the valve is opened toward the pressure accumulation chamber by the air pressure, so that the compressed air is supplied to the pressure accumulation chamber for driving the tool. On the other hand, when the air hose is disconnected from the joint, the air within the pressure accumulation chamber is prevented from flowing through the valve, so that the air may not be abruptly exhausted from the joint to the outside and that no unpleasant sound may be produced.

The invention will become more fully apparent from the claims and the description as it proceeds in connection with the drawings.

DETAILED DESCRIPTION OF THE PREFERRED EMBODIMENTS

A first embodiment of the present invention will now be described with reference to FIGS. 1 to 3.

Figure 3:
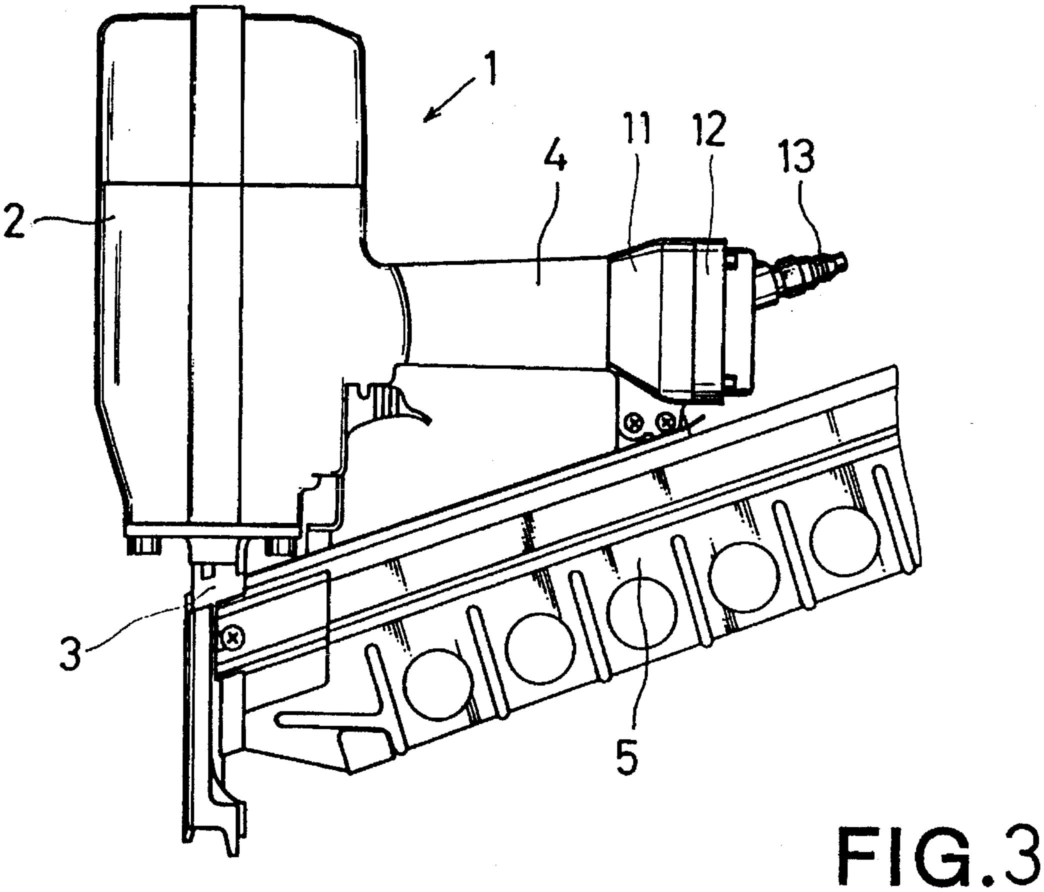
FIG. 3 is a side view of the pneumatic nailer.

Referring to FIG. 3, there is shown a pneumatic nailer 1 according to a first embodiment of the present invention. The nailer 1 includes a body 2 which accommodate an impact piston and a head valve (not shown) therewithin. A driver guide 3 extends downwardly from the body 2 to provide a guide for a nail driver (not shown). The body 2 has a handle 4 extending laterally from the middle portion of the body 2 in a T-shape manner. A nail magazine 5 extends between the driver guide 3 and the handle 4.

Figure 1:
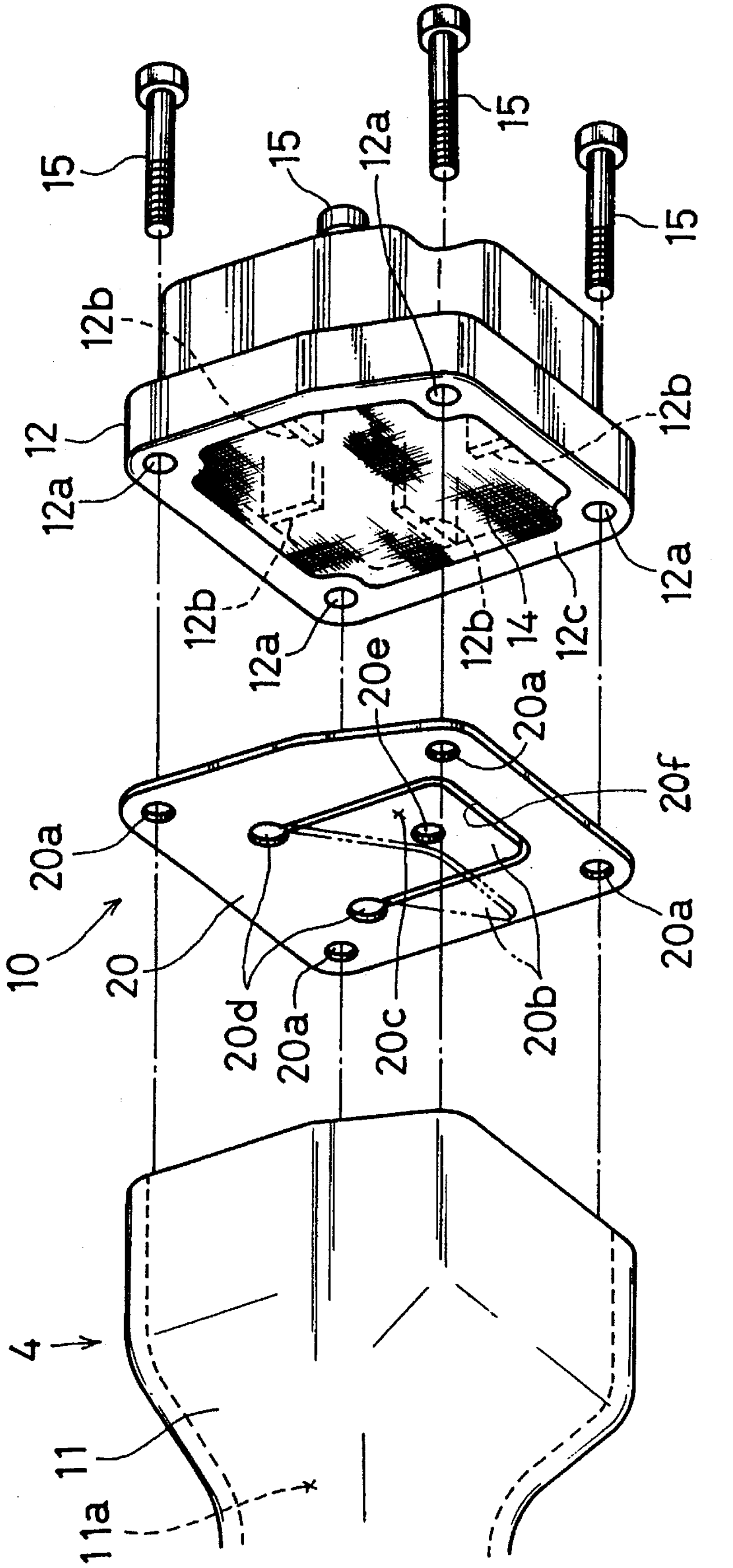
FIG. 1 is an exploded perspective view of a part of a handle of a pneumatic nailer according to a first embodiment of the present invention.
Figure 2:
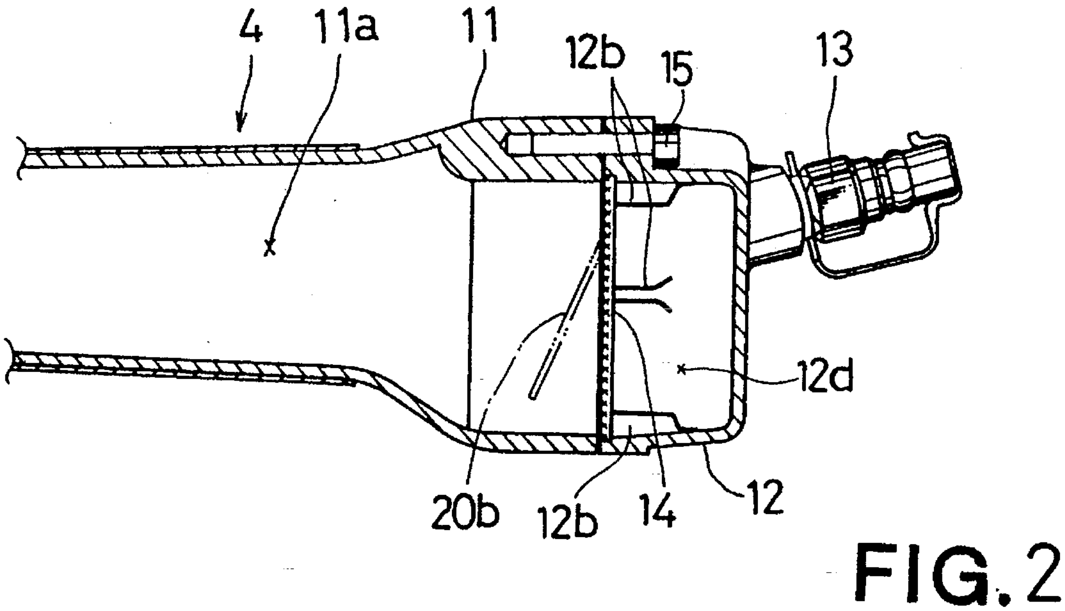
FIG. 2 is a vertical sectional view of the part of the handle.

As shown in FIGS. 1 and 2, the handle 4 has a hollow handle body 11 and a handle cap 12 detachably mounted on the handle body 11. A pressure accumulation chamber 11*a* is formed within the handle body 11 for accumulating the air to be supplied to the head valve of the body 2.

A joint 13 is mounted on an end wall of the handle cap 12 for connection with an air hose (not shown) which is in turn connected to a compression air source (not shown). The handle cap 12 has a substantially cup-shaped configuration and forms a handle chamber 12*d* therein. The handle cap 12 has an open end on the side opposite to the end wall. A plurality of ribs **12*b* are formed on an inner wall of the handle cap 12 at a position adjacent the open end and provide a seat for a flat mesh-like filter 14, so that the filter 14 is positioned flush with an open end surface 12*c* of the handle cap 12. The mesh-like filter 14 is made of synthetic resin and functions such that the filter 14 permits passage of the compressed air but prevents fine dusts from passing therethrough. Therefore, the compressed air supplied into the handle chamber 12*d* via the joint 13 enters the pressure accumulation chamber 11*a* through the filter 14. The handle cap 12 has screw inserting holes 12*a* formed therein at four corners thereof. The screw inserting holes 12*a* are adapted to insert fastening screws 15 for fixing the handle cap 12 to the handle body 11**.

The handle cap 12 is fixed to the handle body 11 by the fastening screws 15 as described above with a flat plate-like gasket 20 interposed between the handle cap 12 and the handle body 11. The gasket 20 constitutes a sound reducing device 10 as will be explained later. As shown in FIG. 1, the gasket 20 has a configuration substantially identical with the outer peripheral configuration of the open end surface **12*c* and includes screw inserting holes 20*a* formed therein at four corners for inserting the fastening screws 15. Thus, the peripheral portion of the gasket 20 is clamped between the open end surface 12*c* and an open end surface confronting thereto of the handle body 11** so as to provide an air tight seal.

In this embodiment, the gasket 20 is a laminated product having a central metal layer and two rubber layers superposed on both sides of the metal layer.

The gasket 20 has a substantially U-shaped slit **20*f* to form a tongue-like valve member 20*b* at its central portion, so that the valve member 20*b* can be resiliently bent to create a large opening 20*c* at the central portion of the gasket 20. When the compressed air is supplied into the handle chamber 12*d*, the air passing through the filter 14 forces the valve member 20*b* to be bent upwardly toward the pressure accumulation chamber 11*a* to create the opening 20*c*. The air passing through the filter 14 then enters the pressure accumulation chamber 11*a* via the opening 20*c*. As shown in FIG. 1, circular holes 20*d* each having a diameter greater than the width of the slit 20*f* are formed in the gasket 20 and are connected to both ends of the slit 20*f* so as to prevent accumulation of stress at these ends. Thus, the circular holes 20*d* prevent the creation of cracks at both ends of the slit 20*f* even if the valve member 20*d* has been repeatedly opened and closed, so that the durability of the valve member 20*b*** is improved.

In addition, a small communication hole **20*e* is formed in the valve member 20*b* and serves to permit the air within the pressure accumulation chamber 11*a*** to be exhausted to the outside as will be explained later.

Since the handle cap 12 is mounted on the handle body 11 by the fastening screws 15 with the gasket interposed between the open end surface **12*c* and the open end surface confronting thereto of the handle body 11 as described above, the gasket 20 is positioned adjacent the filter 14 and is substantially superposed on the filter 14 on the side of the pressure accumulation chamber 11*a*. Therefore, although the valve member 20*b* can be bent toward the pressure accumulation chamber 11*a* as described above, the valve member 20*b* is prevented from bending toward the handle chamber 12*d* by means of the filter 14. Thus, the filter 14 has a function to prevent the valve member 20*b* from opening in a direction toward the handle chamber 12*d*** in addition to the function of filtration of the air.

The operation of the pneumatic nailer 1 of above embodiment will now be explained. When the air hose from the compressed air source is connected to the joint 13, the compressed air enters the handle chamber **12*d*. The compressed air is filtrated by the filter 14 and then forces the valve member 20*b* of the gasket 20 to be bent toward the pressure accumulation chamber 11 and to form the opening 20*c*. The compressed air therefore passes through the opening 20*c* and enters the pressure accumulation chamber 11*a*. The air accumulated within the pressure accumulation chamber 11*a* is supplied to the impact piston via the head valve, and the driver is reciprocally moved within the driver guide 3** by the impact piston for driving the nails one after another.

After completion of the driving operation of nails, the air hose is disconnected from the joint 13, so that the handle chamber **12*d* is opened to the outside via the joint 13. At this stage, the air is still accumulated in the pressure accumulation chamber 11*a*, and the pressure of the air is applied to the valve member 20*b* to open the same in the direction toward the handle chamber 12*d*. However, the movement of the valve member 20*b* toward the handle chamber 12*d* is prevented by the filter 14 which is positioned adjacent the gasket 20 on the side of the handle chamber 12*d*. Therefore, the air within the pressure accumulation chamber 11*a* may not be exhausted to the outside through the valve member 20*b* but is gradually exhausted through the small communication hole 20*e*. Thus, the air within the pressure accumulation chamber 11*a*** may not abruptly be exhausted to the outside, so that unpleasant exhaust sounds may not be produced.

As described above, with the pneumatic nailer 1 of this embodiment, the sound reduction device 30 is constituted by the valve member **20*b* which functions as a counterflow prevention valve and which is formed in the gasket 30 for sealing between the handle body 11 and the handle cap 12. Therefore, the production of the unpleasant sounds can be prevented without forming the air channel 35** as in the conventional sound reduction device. Therefore, this embodiment does not require troublesome machining and assembling operations, so that the manufacturing costs can be reduced.

If the nailer 1 has a larger size, the filter 14 may have a larger size. In such a case, in order to prevent the natural deformation of the filter 14, a support plate (not shown) is disposed on the side of the gasket 20 and is adapted to prevent the valve member **20*b* from opening toward the handle chamber 12*d***.

Although, in the above embodiment, the communication hole **20*e* is formed in the gasket 20 for gradually exhausting the air within the pressure accumulation chamber 11*a* to the outside, such a communication hole may be eliminated by determining the slit 20*f*** to have a width sufficient to permit the air to be gradually exhausted.

Figure 4:
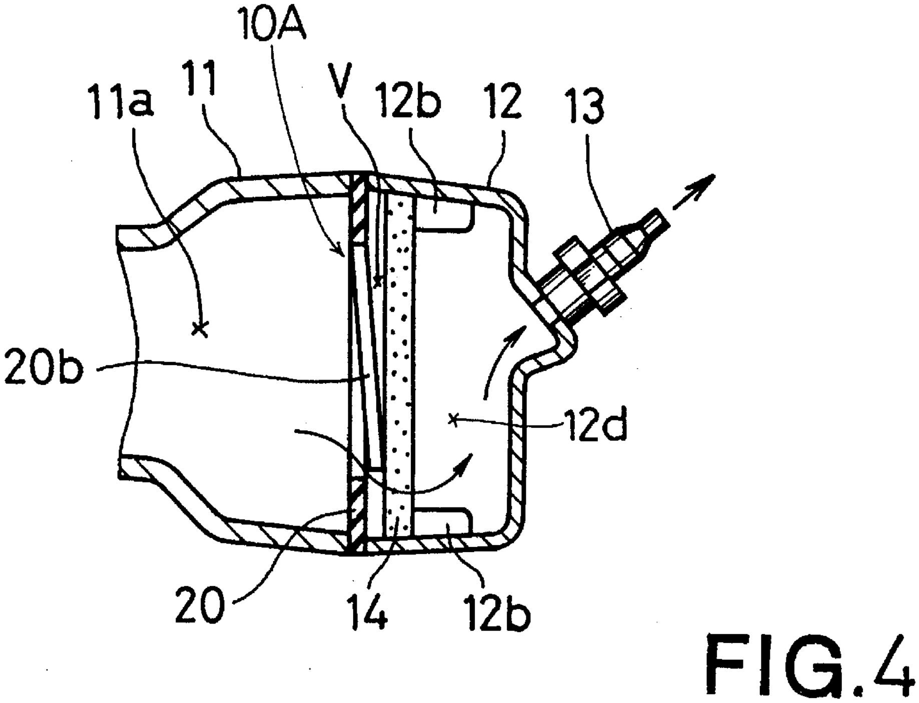
FIG. 4 is a sectional view similar to FIG. 2 but showing the construction of a pneumatic nailer according to a second embodiment of the present invention.
Figure 5:
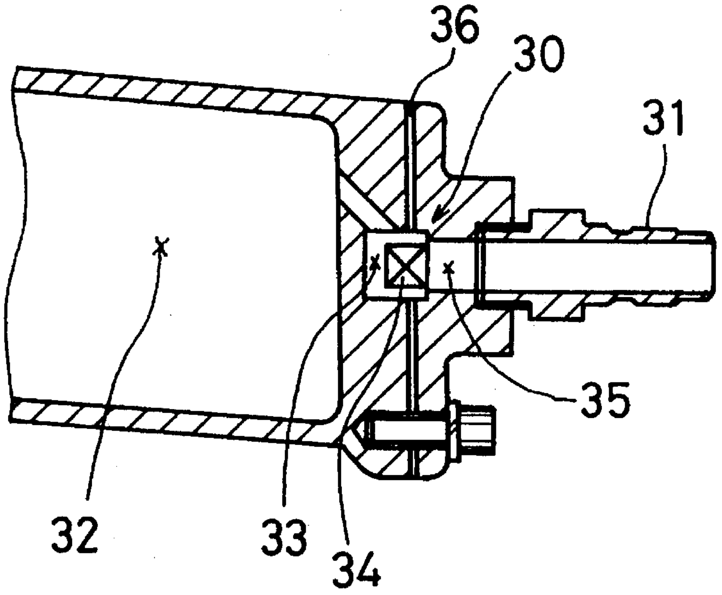
FIG.5 PRIOR ART
FIG. 5 is a vertical sectional view of a handle of a conventional pneumatic nailer.

A second embodiment of the present invention will now be described with reference to FIG. 4. This embodiment is a modification of the first embodiment and relates to an alternative measure for eliminating the communication hole **20*e***. Like members are given the same reference numerals and their description will not be repeated.

A sound reducing device 10A of this embodiment is different from the sound reducing device 10 of the first embodiment in that the ribs **12*b* is positioned away from the open end 12*c* of the handle housing 12 by a distance greater than the distance between the open end 12*c* and the ribs 12*b* of the first embodiment, so that the filter 14 is not flush with the open end 12***c* but is positioned away from the open end 12*c*. Thus, with this embodiment, a gap V is created between the gasket 20 and the filter 14. With the provision of the gap V, the valve member 20*b* is slightly opened toward the handle housing 12*d* by the pressure of the air within the pressure accumulation chamber 11*a* when the air hose has been disconnected from the joint 13. Therefore, the air within the pressure accumulation chamber 11*a* is gradually exhausted to the outside as indicated by arrows in FIG. 4. This means that this embodiment does not require the air communication hole 20*e* as required in the first embodiment nor require the particular determination of the width of the slit 20*f*, so that the machining operation of the gasket 20 can be simplified.

While the invention has been described with reference to preferred embodiments thereof, it is to be understood that modifications or variations may be easily made without departing from the spirit of this invention which is defined by the appended claims.

What is claimed is:

1. A pneumatic tool comprising:

a body having a pressure accumulation chamber formed therein for accumulating compressed air;

a cap mounted on said body and having a cap chamber formed therein for communication with said pressure accumulation chamber, said cap having a joint for connection with an air hose from a compressed air source; and a gasket interposed between said pressure accumulation chamber and said cap chamber, said gasket having means forming a valve for preventing counterflow of the air within said pressure accumulation chamber to said cap chamber, so that exhaust sounds of the air are prevented from being produced when the air hose is disconnected from said joint.

2. The pneumatic tool as defined in claim 1 wherein said gasket has a flat plate-like configuration and extends substantially over the overall sectional area of said body and said cap in a boundary plane between end portions of said body and said cap confronting each other, and wherein said means forming said valve includes a tongue-like valve member formed by a slit cut in said gasket.

3. The pneumatic tool as defined in claim 2 wherein said slit has a substantially U-shaped configuration.

4. The pneumatic tool as defined in claim 2 further including a flat plate-like filter positioned adjacent said gasket on the side of said cap chamber, said filter being operable to prevent said valve member from opening toward said cap chamber.

5. The pneumatic tool as defined in claim 4 further including a small communication hole formed in said gasket, said communication hole always permitting communication between said pressure accumulation chamber and said cap chamber.

6. The pneumatic tool as defined in claim 2 further including a flat plate-like filter positioned adjacent said gasket on the side of said cap chamber, said filter being spaced from said gasket to permit said valve member to be slightly opened toward said cap chamber.

7. The pneumatic tool as defined in claim 2 further including tightening means for detachably fixing said cap to said body, so that said gasket is clamped between said end portions of said body and said cap by tightening said tightening means.

8. The pneumatic tool as defined in claim 7 further including a flat plate-like filter positioned adjacent said gasket on the side of said cap chamber, said filter being held together with said gasket between said end portions of said body and said cap.

9. The pneumatic tool as defined in claim 8 further including a plurality of ribs formed on an inner wall of said cap for engaging said filter on the side opposite to said gasket.

* * * * *